(12) United States Patent
Cahill (10) Patent No.: US 10,155,583 B2
(45) Date of Patent: Dec. 18, 2018

(54) AIRCRAFT CONTROL SYSTEM ARCHITECTURE

(71) Applicant: GOODRICH CORPORATION, Charlotte, NC (US)

(72) Inventor: Eric Daniel Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 111 days.

(21) Appl. No.: 15/293,667

(22) Filed: Oct. 14, 2016

(65) Prior Publication Data

US 2018/0105261 A1 Apr. 19, 2018

(51) Int. Cl.

| | |
|---|---|
| *B64C 25/42* | (2006.01) |
| *B64C 25/26* | (2006.01) |
| *B64C 25/34* | (2006.01) |
| *B64C 25/44* | (2006.01) |
| *B64C 25/50* | (2006.01) |
| *B64D 45/00* | (2006.01) |
| *G05B 19/04* | (2006.01) |

(52) U.S. Cl.
CPC ............ *B64C 25/426* (2013.01); *B64C 25/26* (2013.01); *B64C 25/34* (2013.01); *B64C 25/44* (2013.01); *B64C 25/50* (2013.01); *B64D 45/00* (2013.01); *G05B 19/04* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 7,369,922 B2 | 5/2008 | Garcia | |
| 8,600,584 B2* | 12/2013 | Fervel | ............... B64C 13/50 701/3 |
| 8,935,017 B2 | 1/2015 | Ros Perez | |
| 9,137,038 B1* | 9/2015 | Mazuk | ............... G06F 11/14 |
| 2003/0016520 A1 | 1/2003 | Cooney et al. | |
| 2009/0119721 A1* | 5/2009 | Perlman | ............... H04N 7/24 725/76 |

(Continued)

FOREIGN PATENT DOCUMENTS

EP 2413208 2/2012

OTHER PUBLICATIONS

Euopean Patent Office, European Search Report dated Apr. 3, 2018 in Application No. 17190528.4-1204.

*Primary Examiner* — Tamara L Weber
(74) *Attorney, Agent, or Firm* — Snell & Wilmer L.L.P.

(57) ABSTRACT

A controller unit for an aircraft control system includes an interface that is electrically connectable to a controller slot of an electronics bay of the aircraft control system, a processor coupled to the interface, and a tangible non-transitory computer-readable medium having instructions stored thereon that, in response to execution by the processor, cause the processor to perform various operations. The various operations include identifying, by the processor, a first aircraft assembly in electrical communication with the controller slot of the electronics bay, identifying, by the processor, a first program code stored on the tangible non-transitory computer-readable medium corresponding to the first aircraft assembly, and selecting, by the processor, the first program code to control the first aircraft assembly.

18 Claims, 5 Drawing Sheets

(56) References Cited

U.S. PATENT DOCUMENTS

2010/0287545 A1\* 11/2010 Corbefin ............. G06F 9/44584
   717/174
2015/0291280 A1   10/2015 Iordanidis et al.
2016/0154391 A1\*  6/2016 Pavaskar ................ G05B 15/02
   701/3

\* cited by examiner

AIRCRAFT CONTROL SYSTEM ARCHITECTURE

FIELD

The present disclosure relates to aircraft systems, and more specifically, to an aircraft control system architecture.

BACKGROUND

Aircraft control systems often include multiple different types of controllers. Generally, each type of controller is specifically configured to communicate with and thus control a specific type of aircraft assembly. For example, a primary brake assembly is generally controlled by a primary brake controller while. If the primary system fails, a secondary system can take control via a secondary brake controller that controls a secondary brake assembly. Accordingly, multiple types of controllers are generally utilized with respective multiple types of assemblies, thereby compelling an aircraft operator or manufacturer to provide multiple, unique controllers.

SUMMARY

In various embodiments, the present disclosure provides a controller unit for an aircraft control system. The controller unit may include an interface that is electrically connectable to a controller slot of an electronics bay of the aircraft control system, a processor coupled to the interface, and a tangible non-transitory computer-readable medium having instructions stored thereon that, in response to execution by the processor, cause the processor to perform various operations. The various operations include identifying, by the processor, a first aircraft assembly in electrical communication with the controller slot of the electronics bay, identifying, by the processor, a first program code stored on the tangible non-transitory computer-readable medium corresponding to the first aircraft assembly, and selecting, by the processor, the first program code to control the first aircraft assembly.

In various embodiments, the controller unit is configured to identify the first aircraft assembly of a plurality of aircraft assemblies by determining to which controller slot of a plurality of controller slots of the electronics bay the controller unit is connected. The controller unit may be configured to identify the first program code of a plurality of program codes stored on the tangible non-transitory computer-readable medium that corresponds to the first aircraft assembly. The processor of the controller unit may be configured to execute the first program code to control the first aircraft assembly.

In various embodiments, the first aircraft assembly is a first landing assembly of a plurality of landing assemblies and the first program code is one of a plurality of program codes stored on the tangible non-transitory computer-readable medium. The plurality of program codes may include an inboard brake program code, an outboard brake program code, a primary brake program code, and a secondary brake program code. The plurality of program codes may further include a steering program code, a landing gear program code, a health monitoring program code, and a landing gear extend/retract code.

Also disclosed herein, according to various embodiments, is an aircraft control system. In various embodiments, the aircraft control system includes an electronics bay having a plurality of controller slots, wherein each controller slot of the plurality of controller slots corresponds to and is configured to electrically communicate with a respective aircraft assembly of a plurality of aircraft assemblies. In various embodiments, the aircraft control system further includes a controller unit having an interface that is electrically connectable to individual controller slots of the plurality of controller slots of the electronics bay, a processor coupled to the interface, and a tangible non-transitory computer-readable medium having instructions stored thereon that, in response to execution by the processor, cause the processor to perform various operations. The various operations may include identifying, by the processor, a first aircraft assembly of the plurality of aircraft assemblies in electrical communication with a first controller slot of the plurality of controller slots of the electronics bay. The various operations may further include identifying, by the processor, a first program code of a plurality of program codes stored on the tangible non-transitory computer-readable medium corresponding to the first aircraft assembly. Still further, the various operations performed by the processor may include selecting, by the processor, the first program code to control the first aircraft assembly.

In various embodiments, the plurality of aircraft assemblies includes a plurality of landing assemblies. The plurality of landing assemblies may include an inboard brake assembly, an outboard brake assembly, a primary brake assembly, and a secondary brake assembly and the plurality of program codes may include an inboard brake program code, an outboard brake program code, a primary brake program code, and a secondary brake program code. Further, the plurality of landing assemblies may include a steering assembly, a landing gear assembly, and a health monitoring assembly and the plurality of program codes may include a steering program code, a landing gear program code, and a health monitoring program code.

In various embodiments, the electronics bay includes a rack that includes landing system controller slots and non-landing system controller slots. In various embodiments, the interface of the controller unit is a first interface, wherein each controller slot of the plurality of controller slots of the electronics bay includes a second interface that corresponds to and is configured to electrically communicate with a respective aircraft assembly of the plurality of aircraft assemblies. In various embodiments, the first interface of the controller unit is electrically connectable with the second interface of each controller slot of the plurality of controller slots for electrically communicating with the plurality of aircraft assemblies. The second interface may include a plurality of pins and the first interface may include a plurality of receptacles configured to align with and receive the plurality of pins. In various embodiments, the controller unit is configured to inherit control of the first aircraft assembly of the plurality of aircraft assemblies upon connecting the controller unit to the first controller slot of the plurality of controller slots that corresponds to and is electrically connected with the first aircraft assembly.

Also disclosed herein, according to various embodiments, is a method for controlling an aircraft control system. The method may include identifying, by a processor of a controller unit, a first aircraft assembly in electrical communication with a first controller slot of an electronics bay of the aircraft control system. The method may further include identifying, by the processor of the controller unit, a first program code stored a tangible non-transitory computer-readable medium of the controller unit corresponding to the first aircraft assembly. The method may also include selecting, by the processor of the controller unit, the first program code to control the first aircraft assembly.

In various embodiments, the method further includes connecting the controller unit to a second controller slot of the electronics bay of the aircraft control system, identifying, by the processor of the controller unit, a second aircraft assembly in electrical communication with the second controller slot, identifying, by the processor of the controller unit, a second program code stored on the tangible non-transitory computer-readable medium of the controller unit corresponding to the second aircraft assembly, and selecting, by the processor of the controller unit, the second program code to control the second aircraft assembly. In various embodiments, the aircraft system is an aircraft landing system and the first aircraft assembly and the second aircraft assembly are landing assemblies. The method may further include sequentially connecting the controller unit to multiple controller slots of the electronics bay to troubleshoot a plurality of aircraft assemblies.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Aircraft include one or more types of aircraft assemblies, such as wheel and brake assemblies. While many details and examples are included throughout the present disclosure pertaining to aircraft landing assemblies, such as braking assemblies, steering assemblies, etc., the scope of the present disclosure is not limited to landing assemblies/subsystems.

Aircraft wheel and brake assemblies may include a non-rotatable wheel support, a wheel mounted to the wheel support for rotation, and a brake disk stack. The brake stack may also have alternating rotor and stator disks mounted with respect to the wheel support and wheel for relative axial movement. Each rotor disk may be coupled to the wheel for rotation therewith, and each stator disk may be coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like. The actuator rams may be electrically operated actuator rams or hydraulically operated actuator rams, although some brakes may use pneumatically operated actuator rams.

Figure 1A:
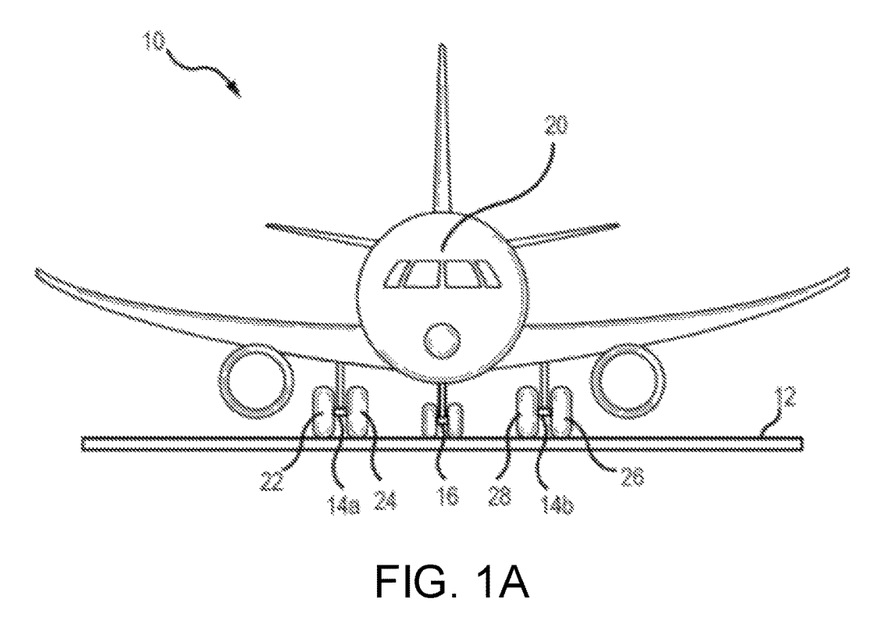
FIG. 1A illustrates an aircraft, in accordance with various embodiments.

With reference to FIG. 1A, an aircraft 10 on a runway 12 is shown in accordance with various embodiments. Aircraft 10 may comprise a right landing gear assembly 14a and a left landing gear assembly 14b. Nose landing gear assembly 16 is located under the nose of aircraft 10. Each landing gear assembly is illustrated in FIG. 1A, for example, as having two wheels. For example, the right landing gear assembly 14a may comprise a plurality of wheels, such as a right outboard wheel 22 and a right inboard wheel 24. The left landing gear assembly 14b may comprise a plurality of wheels, such as a left outboard wheel 26 and a left inboard wheel 28. In various embodiments, aircraft 10 may include additional assemblies.

As described above, aircraft assemblies are actuated and controlled by controller units. In various embodiments, and with reference to FIG. 1B, a controller unit 100 includes an interface 105, a processor 106, and a tangible, non-transitory, computer-readable medium ("computer-readable medium") 110. The computer-readable medium 110 includes instructions stored thereon that, in response to execution by the processor, cause the processor to perform various operations. Program code (i.e., program instructions and/or controller instructions), as described in greater detail below, may be loaded onto the computer-readable medium 110 (also referred to herein as a tangible, non-transitory, memory). The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 1B:
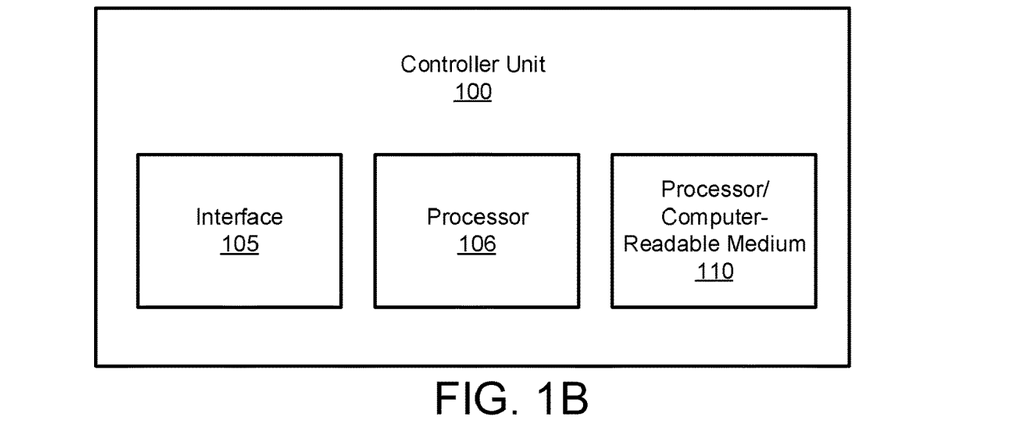
FIG. 1B is a schematic block diagram of a controller unit for an aircraft control system, in accordance with various embodiments.

The interface 105 of the controller unit 100, according to various embodiments, is electrically connectable to a plurality of aircraft assemblies. Said differently, the controller unit 100 of the present disclosure is capable of electrically connecting, via the interface 105, with different types of aircraft assemblies to actuate and/or control such assemblies. As used herein, the term aircraft assembly and/or landing assembly refers to a group of components, subsystems, actuators, etc., that are related to a certain feature of an aircraft. Additional details pertaining to the plurality of aircraft assemblies and the configuration of the interface 105 are included below with reference to FIG. 4.

Figure 2:
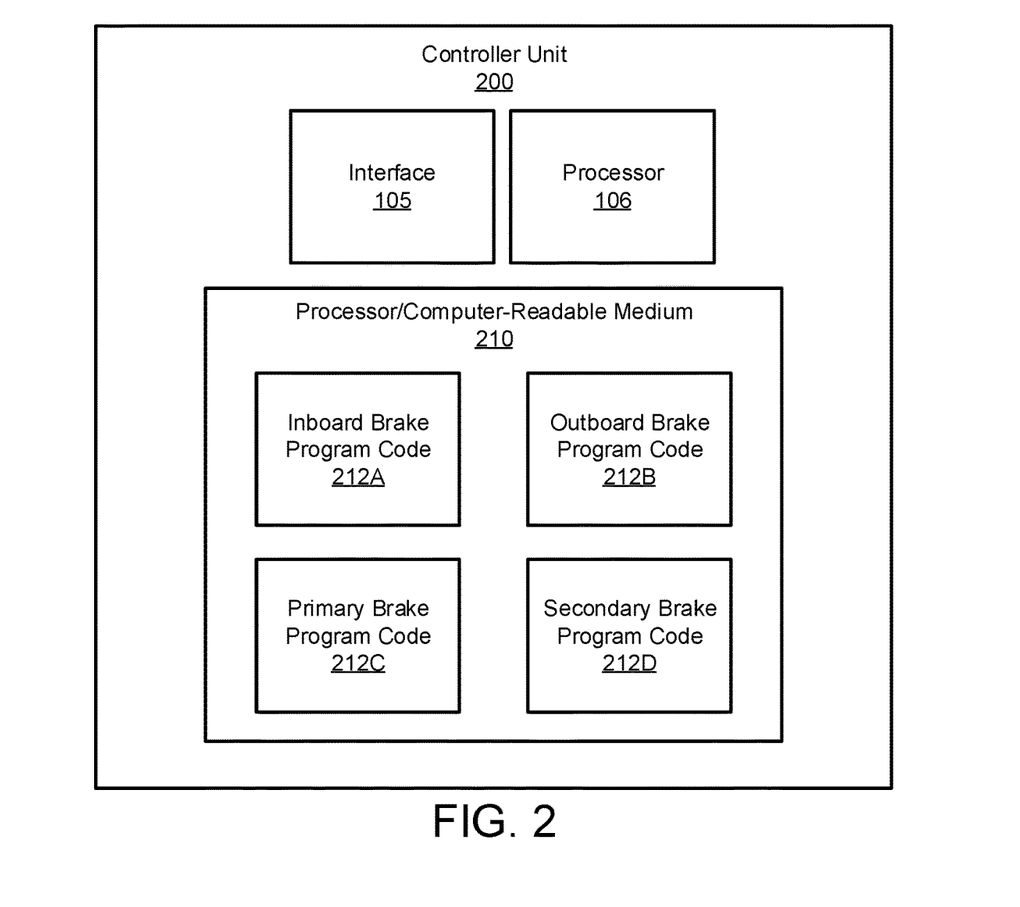
FIG. 2 is a schematic block diagram of a controller unit for an aircraft control system, in accordance with various embodiments.

In various embodiments, and with reference to FIG. 2, the computer-readable medium 210 of the controller unit 200 may include a plurality of program codes 212A, 212B, 212C, and 212D (when referring to a plurality of program codes, the reference number "212" will be used herein). As mentioned above, like numerals denote like elements. In various embodiments, the plurality of program codes 212 may include an inboard brake program code 212A, an outboard brake program code 212B, a primary brake program code 212C, and a secondary brake program code 212D, among others. Each of these program codes 212A, 212B, 212C, and 212D may be specifically configured to actuate and/or control an aircraft assembly, such as an inboard brake assembly, an outboard brake assembly, a primary brake assembly, and a secondary brake assembly, respectively.

In various embodiments, the inboard brake assembly includes one or more brake disk stacks, actuator rams, and/or other components configure to perform braking actions on one or more inboard wheels 24, 28 of the aircraft 10. In various embodiments, the outboard brake assembly includes one or more brake disk stacks, actuator rams, and/or other components configured to perform braking actions on one or more outboard wheels 22, 26. In various embodiments, the primary brake assembly and the secondary brake assembly include primary components (e.g., electrically operated actuator rams) and secondary components (e.g., hydraulically operated actuator rams), respectively, thereby providing redundant braking capabilities.

Each program code 212A, 212B, 212C, and 212D of the plurality of program codes 212, according to various embodiments, corresponds to and is configured to control a respective aircraft assembly of the plurality of aircraft assemblies mentioned above. That is, the controller unit 200 has multiple program codes 212 stored on its computer-readable medium 210 to enable the single controller unit 200 to be electrically connectable to (via the interface 105) and thereby control different types of aircraft assemblies. Accordingly, an aircraft operator or manufacturer may not need to provide and/or have in stock multiple different types of conventional controllers, but instead may use a single type of controller, such as the controller units 100 and/or 200. That is, each controller unit 100 and/or 200 may be available to control any one of various types of aircraft assemblies by having a plurality of program codes 212 stored on its computer-readable medium 210. In various embodiments, the controller unit 100/200 may be implemented in various different types/models of aircraft.

Figure 3:
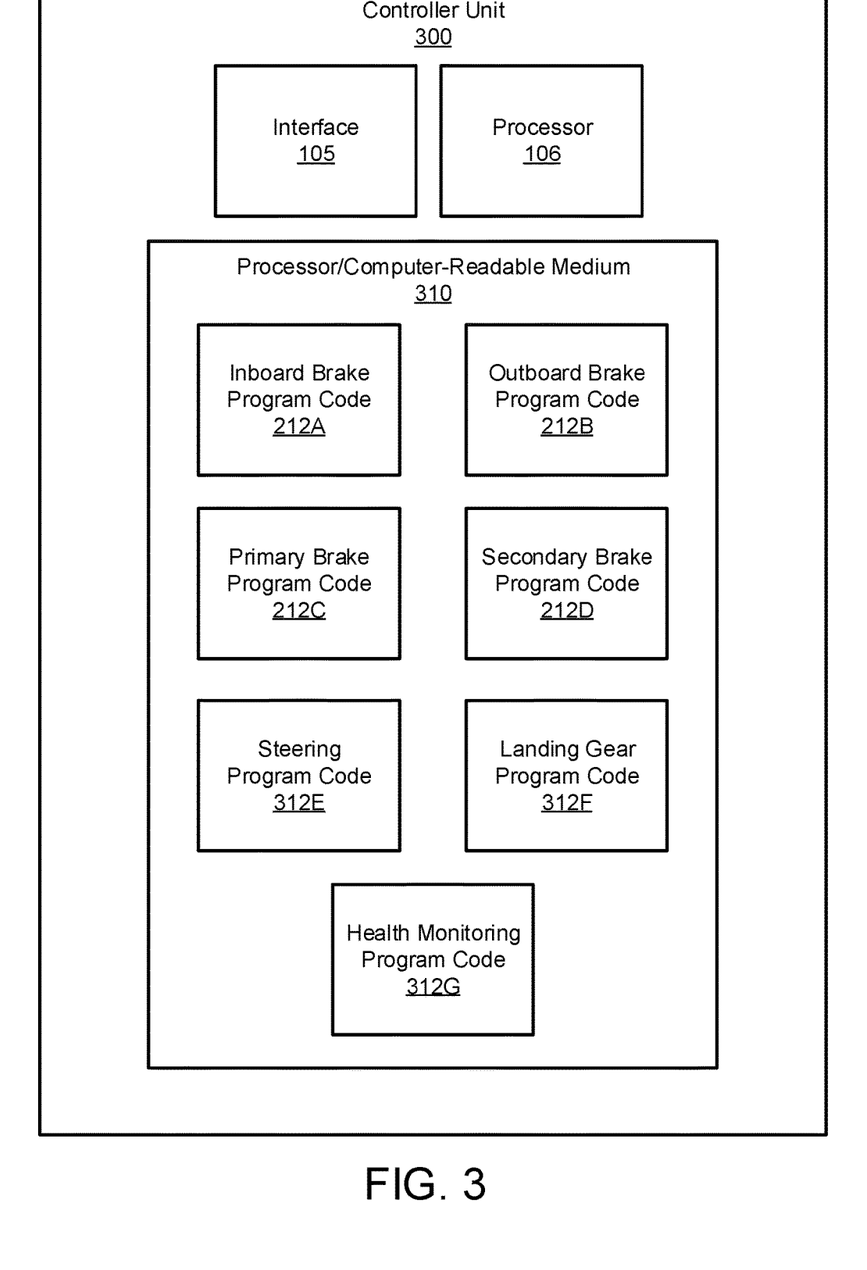
FIG. 3 is a schematic block diagram of a controller unit for an aircraft control system, in accordance with various embodiments.

In various embodiments, and with reference to FIG. 3, the computer-readable medium 310 of the controller unit 300 may include, in addition to the previously described program codes 212, a steering program code 312E, a landing gear program code 312F, and a health monitoring program code 312G, among others. Each of these program codes 312E, 312F, and 312G may be specifically configured to actuate and/or control an aircraft assembly, such as an steering assembly, an landing gear assembly (e.g., a landing gear extend/retract assembly), and a health monitoring assembly, respectively. The health monitoring assembly may be configured to monitor the status, condition, and/or condition of various aircraft assemblies.

Figure 4:
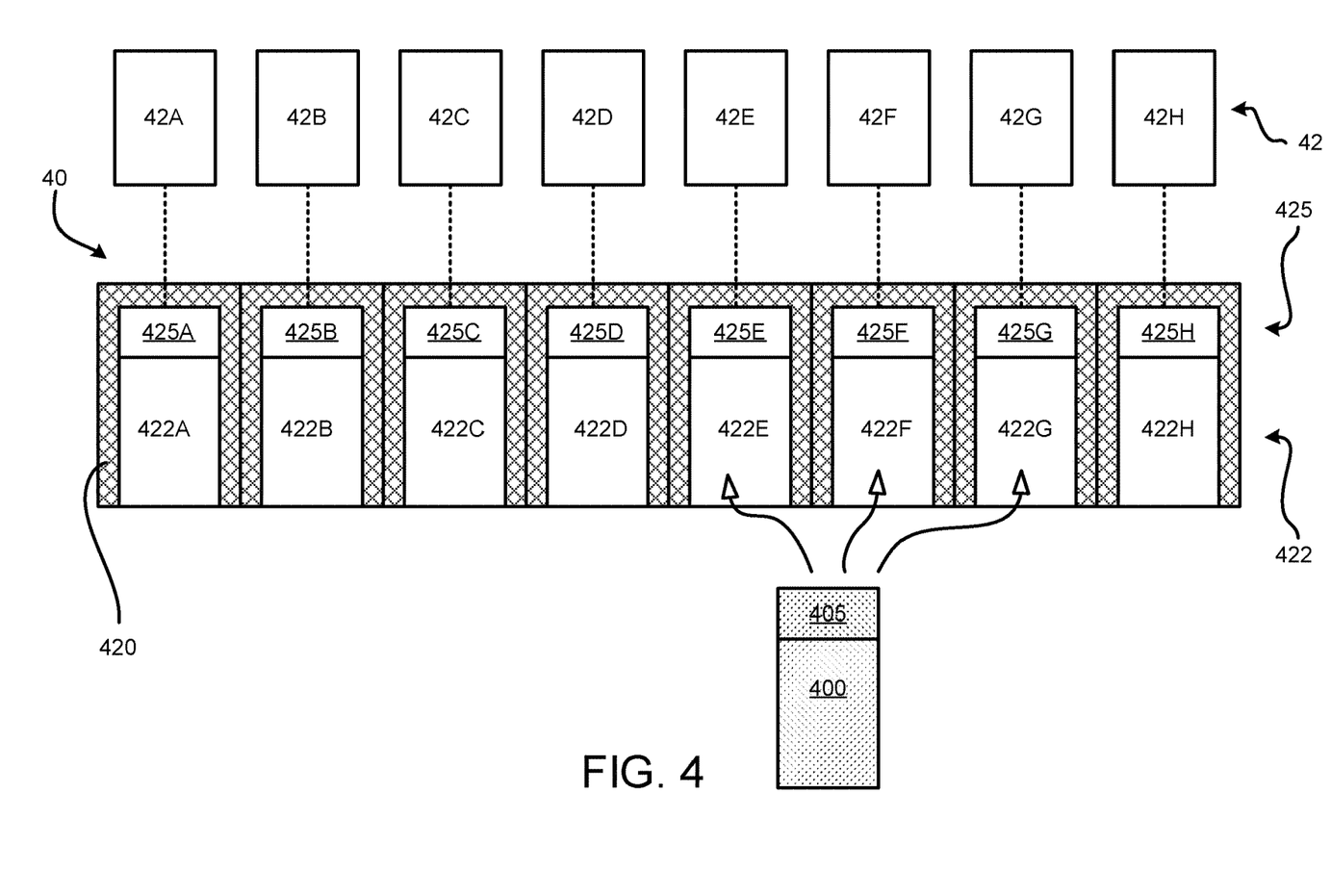
FIG. 4 illustrates a schematic view of an aircraft control system, in accordance with various embodiments.

In various embodiments, and with reference to FIG. 4, an aircraft control system 40 is disclosed. The aircraft control system 40 includes, according to various embodiments, an electronics bay 420 that has a plurality of controller slots 422A, 422B, 422C, 422D, 422E, 422F, 422G, and 422H (when referring to the plurality of controller slots, reference number "422" will be used herein). The electronics bay 420 of the aircraft control system 40 may have more or less controller slots 412 than the number shown in FIG. 4. In various embodiments, the electronics bay 420 may have multiple rows, columns, and/or racks of controller slots and/or the electronics bay 420 may not be in a single location in the aircraft but instead may be comprised in different locations throughout the aircraft. That is, showing the controller slots 422 juxtaposed next to each other is a schematic, exemplary depiction only and thus does not limit the scope of the present disclosure as to the positioning, location, and configuration of the controller slots 422.

In various embodiments, the plurality of controllers slots 422 are substantially the same size, thereby allowing the controller unit 400 to be received within any of the controller slots 422. In various embodiments, each controller slot 422A, 422B, 422C, 422D, 422E, 422F, 422G, and 422H has a respective interface 425A, 425B, 425C, 425D, 425E, 425F, 425G, and 425H (when referring to the plurality of interfaces of the controller slots 422, reference number "425" will be used herein) that is configured to electrically connect with the interface 405 of the controller unit 400. The interfaces 425 of the controller slots 422 may be substantially the uniform, thereby enabling the interface 405 of the controller unit 400 to connect with any of them. In various embodiments, for example, the interfaces 425 of the controller slot 422 include a plurality of pins that are receivable by a corresponding arrangement of receptacles/pin holes that form the interface 405 of the controller unit 400. While the interfaces 425 of the controller slots 422 may be disposed on a rear wall of the controller slots 422 as shown in FIG. 4, the interfaces 425 of the controller slots 422 may be disposed and/or oriented in other configurations.

The plurality of controller slots 422, via the plurality of interfaces 425, may be in electrical communication with a respective plurality of aircraft assemblies 42. For example, controller slot 422A may be in electrical communication with aircraft assembly 42A via interface 425A, and so on for each of the aircraft assemblies 42A, 42B, 442C, 42D, 42E, 42F, 42G, and 42H (when referring to the plurality of aircraft assemblies, reference number "42" will be used herein). As mentioned above, the aircraft assemblies 42 may be located in different locations throughout the aircraft and may include various components, actuators, elements, and subsystems pertaining to different operations/features of the aircraft.

In various embodiments, the controller unit 400 is configured to identify an aircraft assembly of the plurality of aircraft assemblies 42 based on which controller slot of the plurality of controller slots 422 it is connected to. In other words, in response to the controller unit 400 being connected to, for example, controller slot 422E via the interface 405 of the controller unit 400 and the interface 425E of said controller slot 422E, the controller unit 400 may detect to which aircraft assembly (42E) it is connected. Upon identifying, by the processor, said aircraft assembly 42E, the controller unit 400 may identify, by the processor, the program code of the plurality of program codes stored on the computer-readable medium 310 (FIG. 3) that corresponds to said aircraft assembly 42E. In response to identifying the aircraft assembly 42E and the corresponding program code, the controller unit 400 may select, and thus may be configured to execute, said program code to inherit control of said aircraft assembly 42E.

In various embodiments, the controller unit 400 may be disconnected and withdrawn from a certain controller slot (e.g., controller slot 422E) and may be inserted into and electrically connected to a different controller slot (e.g., controller slot 422G). In response to connecting to the different controller slot 422G (via the respective interfaces 405, 425G), the controller unit 400 may identify and detect, by the processor, to which aircraft assembly it is connected (e.g., 42G) and thus may identify the corresponding program code of the plurality of program codes stored on the computer-readable medium 310 (FIG. 3). In response to identifying the aircraft assembly (e.g., 42G) and the corresponding program code, the controller unit 400 may be ready to inherit control of the new aircraft assembly (e.g., 42G). Accordingly, as mentioned above, a single controller unit 400 may be swappable between various controller slots to control a plurality of different aircraft assemblies. Therefore, an aircraft can reduce the number of different types of controllers it has on hand because one type of controller, the controller unit disclosed herein, may be able to control various aircraft assemblies/subsystems. In various embodiments, the controller unit may be swappable between various different types/models of aircraft. In other words, in response to the controller unit being connected to a controller slot, the controller unit may identify and detect, by the processor, to what type of aircraft it is connected and the implemented control of the aircraft assemblies may be affected accordingly.

Figure 5:
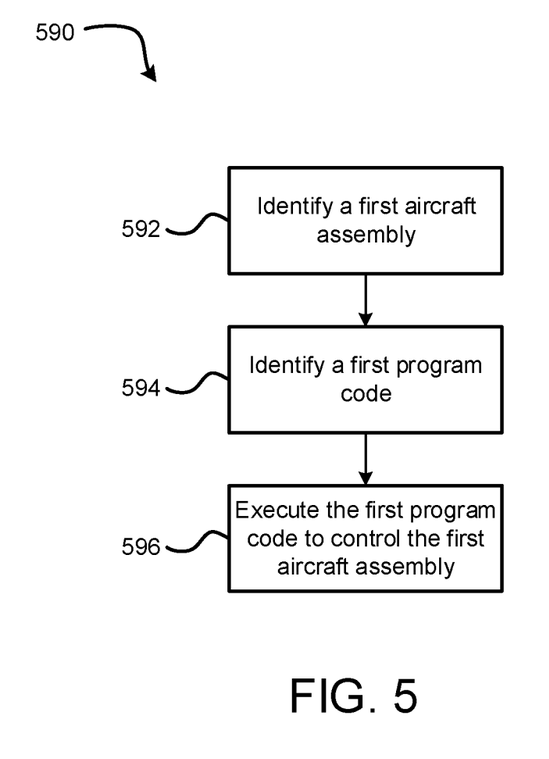
FIG. 5 is a schematic flowchart diagram of a method for controlling an aircraft system, in accordance with various embodiments.

In various embodiments, and with reference to FIG. 5, a method 590 for controlling an aircraft system is disclosed. The method 590, according to various embodiments, includes identifying, by a controller unit, a first aircraft assembly (step 592). In various embodiments, step 592 includes identifying, by the controller unit, a first aircraft assembly of a plurality of aircraft assemblies corresponding to which controller slot of a plurality of controller slots of an electronics bay the controller unit is connected. In various embodiments, each controller slot of the plurality of controller slots corresponds to and is configured to electrically communicate with a respective aircraft assembly of the plurality of aircraft assemblies.

The method 590, according to various embodiments, further includes identifying, by the controller unit, a first program code (step 594). In various embodiments, step 594 includes identifying, by the controller unit, the first program code of a plurality of program codes stored on a tangible non-transitory computer-readable medium corresponding to the first aircraft assembly. In various embodiments, each program code of the plurality of program codes corresponds to and is configured to control a respective one of the plurality of aircraft assemblies.

In various embodiments, the method 590 further includes executing, by the controller unit, the first program code to control the first aircraft assembly (step 596). The method 590 may further include connecting the controller unit to a different controller slot of the plurality of controller slots of the electronics bay. In response to connecting to the different controller slot, the controller unit may identify a second aircraft assembly of the plurality of aircraft assemblies corresponding to said different controller slot of the plurality of controller slots. The method 590 may further include identifying, by the controller unit, a second program code of the plurality of program codes corresponding to the second aircraft assembly and executing, by the controller unit, the second program code to control the second aircraft assembly.

According to various embodiments, the aircraft system may be an aircraft landing system and the plurality of aircraft assemblies may be a plurality of landing assemblies. In various embodiments, the method 590 may include sequentially connecting the controller unit to multiple controller slots of the plurality of controller slots of the electronics bay to troubleshoot the plurality of aircraft assemblies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Also, any reference to attached, fixed, connected, coupled or the like may include permanent (e.g., integral), removable, temporary, partial, full, and/or any other possible attachment option. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A controller unit for an aircraft control system, the controller unit comprising:
    an interface that is electrically connectable to a controller slot of an electronics bay of the aircraft control system;
    a processor coupled to the interface; and
    a tangible non-transitory computer-readable medium having instructions stored thereon that, in response to execution by the processor, cause the processor to perform operations comprising:
        identifying, by the processor, a first aircraft assembly in electrical communication with the controller slot of the electronics bay;
        identifying, by the processor, a first program code stored on the tangible non-transitory computer-readable medium corresponding to the first aircraft assembly; and
        selecting, by the processor, the first program code to control the first aircraft assembly;
    wherein the controller unit is configured to identify the first aircraft assembly of a plurality of aircraft assemblies by determining to which controller slot of a plurality of controller slots of the electronics bay the controller unit is connected.

2. The controller unit of claim 1, wherein the controller unit is configured to identify the first program code of a plurality of program codes stored on the tangible non-transitory computer-readable medium that corresponds to the first aircraft assembly.

3. The controller unit of claim 2, wherein the processor of the controller unit is configured to execute the first program code to control the first aircraft assembly.

4. The controller unit of claim 1, wherein the first aircraft assembly is a first landing assembly of a plurality of landing assemblies and the first program code is one of a plurality of program codes stored on the tangible non-transitory computer-readable medium.

5. The controller unit of claim 4, wherein the plurality of program codes comprises an inboard brake program code, an outboard brake program code, a primary brake program code, and a secondary brake program code.

6. The controller unit of claim 5, wherein the plurality of program codes comprises a steering program code, a landing gear program code, and a health monitoring program code.

7. An aircraft control system comprising:
    an electronics bay comprising a plurality of controller slots, wherein each controller slot of the plurality of controller slots corresponds to and is configured to electrically communicate with a respective aircraft assembly of a plurality of aircraft assemblies; and
    a controller unit comprising:
        an interface that is electrically connectable to individual controller slots of the plurality of controller slots of the electronics bay;
        a processor coupled to the interface; and
        a tangible non-transitory computer-readable medium having instructions stored thereon that, in response to execution by the processor, cause the processor to perform operations comprising:
            determining, by the processor, a first controller slot, of the plurality of controller slots of the electronics bay, to which the controller unit is connected;
            identifying, by the processor, a first aircraft assembly of the plurality of aircraft assemblies in electrical communication with the first controller slot;
            identifying, by the processor, a first program code of a plurality of program codes stored on the tangible non-transitory computer-readable medium corresponding to the first aircraft assembly; and
            selecting, by the processor, the first program code to control the first aircraft assembly.

8. The aircraft control system of claim 7, wherein the plurality of aircraft assemblies comprises a plurality of landing assemblies.

9. The aircraft control system of claim 8, wherein the plurality of landing assemblies comprises an inboard brake assembly, an outboard brake assembly, a primary brake assembly, and a secondary brake assembly and the plurality of program codes comprises an inboard brake program code, an outboard brake program code, a primary brake program code, and a secondary brake program code.

10. The aircraft control system of claim 9, wherein the plurality of landing assemblies comprises a steering assembly, a landing gear assembly, and a health monitoring assembly and the plurality of program codes comprises a steering program code, a landing gear program code, and a health monitoring program code.

11. The aircraft control system of claim 8, wherein the electronics bay comprises a rack comprising landing system controller slots and non-landing system controller slots.

12. The aircraft control system of claim 7, wherein the interface of the controller unit is a first interface, wherein each controller slot of the plurality of controller slots of the electronics bay comprises a second interface that corresponds to and is configured to electrically communicate with a respective aircraft assembly of the plurality of aircraft assemblies.

13. The aircraft control system of claim 12, wherein the first interface of the controller unit is electrically connectable with the second interface of each controller slot of the plurality of controller slots for electrically communicating with the plurality of aircraft assemblies.

14. The aircraft control system of claim 13, wherein the second interface comprises a plurality of pins and the first interface comprises a plurality of receptacles configured to align with and receive the plurality of pins.

15. The aircraft control system of claim 7, wherein the controller unit is configured to inherit control of the first aircraft assembly of the plurality of aircraft assemblies upon connecting the controller unit to the first controller slot of the plurality of controller slots that corresponds to and is electrically connected with the first aircraft assembly.

16. A method for controlling an aircraft control system, the method comprising:
   determining, by a processor of a controller unit, a first controller slot, of a plurality of controller slots of an electronics bay of the aircraft control system, to which the controller unit is connected;
   identifying, by the processor of the controller unit, a first aircraft assembly of a plurality of aircraft assemblies in electrical communication with the first controller slot;
   identifying, by the processor of the controller unit, a first program code of a plurality of program codes stored in a tangible non-transitory computer-readable medium of the controller unit corresponding to the first aircraft assembly; and
   selecting, by the processor of the controller unit, the first program code to control the first aircraft assembly.

17. The method of claim 16, further comprising:
   connecting the controller unit to a second controller slot of the plurality of controller slots of the electronics bay of the aircraft control system;
   identifying, by the processor of the controller unit, a second aircraft assembly of the plurality of aircraft assemblies in electrical communication with the second controller slot;
   identifying, by the processor of the controller unit, a second program code of the plurality of program codes stored on the tangible non-transitory computer-readable medium of the controller unit corresponding to the second aircraft assembly; and
   selecting, by the processor of the controller unit, the second program code to control the second aircraft assembly.

18. The method of claim 16, further comprising sequentially connecting the controller unit to the plurality of controller slots of the electronics bay to troubleshoot the plurality of aircraft assemblies.

* * * * *